(12) United States Patent
Korenaga et al.

(10) Patent No.: US 7,440,009 B2
(45) Date of Patent: Oct. 21, 2008

(54) HIGH DEFINITION IMAGING METHOD AND IMAGING APPARATUS HAVING ELECTRO-OPTICAL POLARIZATION ELEMENT BETWEEN TWO BIREFRIGENT ELEMENTS FORMING ALTERNATELY ON SENSOR SINGLE AND OVERLAPPING IMAGES

(75) Inventors: Tsuguhiro Korenaga, Katano (JP); Seiji Nishiwaki, Kobe (JP); Michiyoshi Nagashima, Ikoma (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 672 days.

(21) Appl. No.: 11/044,523

(22) Filed: Jan. 27, 2005

(65) Prior Publication Data
US 2005/0179786 A1 Aug. 18, 2005

(30) Foreign Application Priority Data
Feb. 13, 2004 (JP) ............................. 2004-036344
Mar. 29, 2004 (JP) ............................. 2004-095155

(51) Int. Cl.
*H04N 5/225* (2006.01)
(52) U.S. Cl. ...................... 348/219.1; 348/340; 348/344
(58) Field of Classification Search .............. 348/218.1, 348/219.1, 240
See application file for complete search history.

(56) References Cited

U.S. PATENT DOCUMENTS

| | | | | |
|---|---|---|---|---|
| 3,719,414 A | * | 3/1973 | Wentz | ........................ 359/247 |
| 5,369,266 A | * | 11/1994 | Nohda et al. | ............. 250/208.1 |
| 5,659,411 A | * | 8/1997 | Nito et al. | .................... 349/117 |
| 5,834,761 A | * | 11/1998 | Okada et al. | ............. 250/208.1 |
| 7,034,784 B2 | * | 4/2006 | Kume et al. | .................... 345/87 |
| 7,106,389 B2 | * | 9/2006 | Katoh et al. | .................... 349/8 |
| 7,116,370 B1 | * | 10/2006 | Huang et al. | ................. 348/335 |
| 7,224,391 B2 | * | 5/2007 | Kimura | ....................... 348/310 |

FOREIGN PATENT DOCUMENTS

| | | | |
|---|---|---|---|
| JP | 61-247168 | | 11/1986 |
| JP | 2-52580 | | 2/1990 |
| JP | 4-63074 | | 2/1992 |
| JP | 5-95517 | | 4/1993 |
| JP | 9-218308 | | 8/1997 |
| JP | 2001228330 A | * | 8/2001 |

* cited by examiner

*Primary Examiner*—Ngoc-Yen T. Vu
*Assistant Examiner*—Paul Saunders
(74) *Attorney, Agent, or Firm*—Hamre, Schumann, Mueller & Larson, P.C.

(57) ABSTRACT

In a method for forming an image of a subject on a solid-state imaging device, a first time period for splitting a light beam from a subject into a plurality of light beams that have different polarization directions and then combining the plurality of light beams to form a single subject image on the solid-state imaging device and a second time period for splitting the light beam from the subject into the plurality of light beams that have different polarization directions and forming a plurality of subject images that overlap each other partially on the solid-state imaging device are switched time-wise. A first image information on the single subject image is obtained based on pieces of signal information in the first time period, and a second image information on one of the plurality of subject images is calculated by using and computing pieces of signal information in the second time period. Then, the high-resolution image of the subject is achieved by using the first image information and the second image information. In this way, it is possible to obtain an image with a high resolution and a reduced noise with substantially no loss of the light beam from the subject.

10 Claims, 7 Drawing Sheets

——— : Drive voltage ON
- - - - : Drive voltage OFF

FIG. 10

——— : Drive voltage ON
- - - - : Drive voltage OFF

FIG. 11
PRIOR ART

HIGH DEFINITION IMAGING METHOD AND IMAGING APPARATUS HAVING ELECTRO-OPTICAL POLARIZATION ELEMENT BETWEEN TWO BIREFRIGENT ELEMENTS FORMING ALTERNATELY ON SENSOR SINGLE AND OVERLAPPING IMAGES

BACKGROUND OF THE INVENTION

1. Field of the Invention

The present invention relates to an imaging method and an imaging apparatus that can provide a small camera module having a high resolution.

2. Description of Related Art

Conventionally, in a solid-state imaging device such as a CCD or a CMOS used for a camera, an attempt has been made to increase the number of pixels with a view to achieving a higher image resolution. If the number of pixels simply are increased while maintaining the size of each pixel, the area of the solid-state imaging device expands, so that the number of devices obtained from a single wafer decreases and the yield lowers, resulting in a cost increase. Accordingly, the pixel size and the pixel pitch are reduced, thereby increasing the number of pixels. However, since the sensitivity and the saturation power generally are proportional to the pixel size, simply reducing the pixel size cannot break the limit of resolution improvement.

As a method for raising the resolution without increasing the number of pixels, a method called "pixel shifting" has been suggested. In this method, a subject image is formed on a solid-state imaging device while being shifted time-wise by ½ of a pixel pitch, thereby sampling the subject image at a spatial frequency higher than that determined by the pixel pitch. When the subject image is shifted in one direction, an image equivalent to that captured with twice as many pixels can be obtained apparently. Also, when it is shifted in two directions perpendicular to each other, an image equivalent to that captured with four times as many pixels apparently can be obtained.

Figure 11:
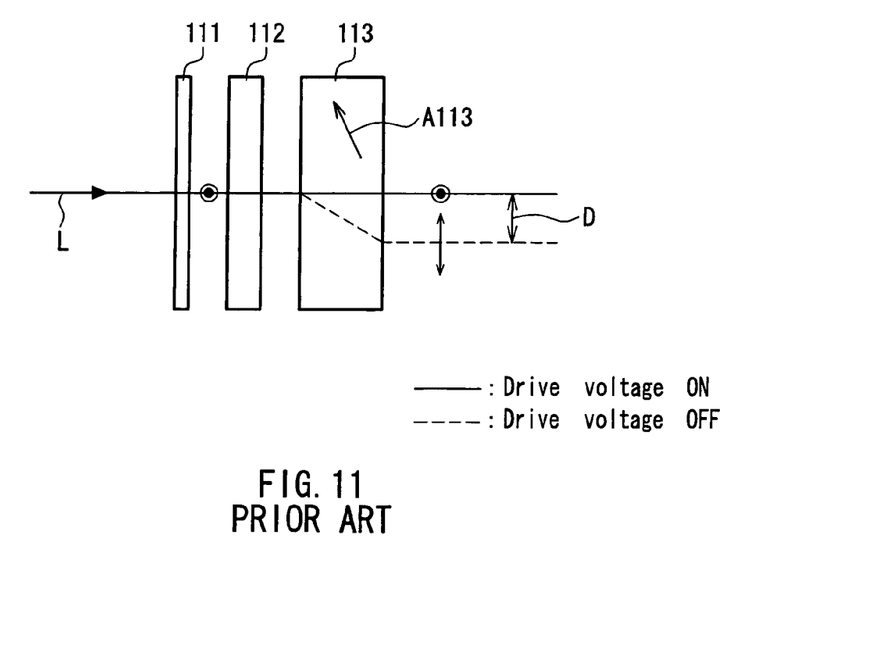
FIG. 11 shows a principle of performing a pixel shifting method in a conventional imaging apparatus.

Specifically, suggested methods for shifting a subject image to be formed on a solid-state imaging device relatively to the solid-state imaging device include a method of swinging the solid-state imaging device itself two-dimensionally using an actuator and a method of mechanically moving a specific optical component constituting an optical system. Other than these methods, a particularly promising method described in JP 2(1990)-52580 A or JP 4(1992)-63074 A is known. The method includes arranging a polarizer, a liquid crystal panel and a quartz-crystal plate in an optical system, in which the liquid crystal panel is electrically driven, thus shifting a subject image by a predetermined distance. FIG. 11 is a drawing for describing this principle.

FIG. 11 shows a quartz-crystal plate 113, which is ground obliquely with respect to its specific optical axis A 113 and transmits an incident light beam while shifting its traveling path according to the beam's polarization direction. In FIG. 11, in the light beam that has entered the quartz-crystal plate 113, a light component whose polarization direction is perpendicular to the surface of a sheet travels straight as an ordinary light beam, whereas a light component whose polarization direction is parallel with the surface of the sheet travels obliquely as an extraordinary light beam. Here, the extraordinary light beam is defined as a light beam that does not follow Snell's law. This makes it possible to shift the path of an incident light beam according to its polarization direction. The shifted amount D can be determined by the thickness of the quartz-crystal plate 113, and in this case, is set to be ½ of the pixel pitch of the solid-state imaging device (not shown) or an odd multiple thereof.

The following description is directed to the case where, in a light beam L from the subject side, only a light component whose polarization direction is perpendicular to the surface of the sheet is transmitted using a polarizer 111. The light beam that has passed through the polarizer 111 reaches a liquid crystal panel 112. The liquid crystal panel 112 is a twisted nematic liquid crystal panel. The polarization direction of the incident light beam is rotated by 90° by a liquid crystal sealed in the liquid crystal panel 112 when a drive voltage to be applied to the liquid crystal panel 112 is OFF, whereas the polarization direction does not change when the drive voltage is ON. Thus, the light beam that has entered the quartz-crystal plate 113 is shifted as an extraordinary light beam as indicated by a broken line when the drive voltage is OFF and travels straight as an ordinary light beam as indicated by a solid line when the drive voltage is ON.

Using such an optical system, the thickness of the quartz-crystal plate 113 is adjusted, thereby shifting the subject image that the light beam passing through the quartz-crystal plate 113 forms on the solid-state imaging device (not shown) by ½ of the pixel pitch (or an odd multiple of ½ of the pixel pitch) according to ON/OFF of the drive voltage of the liquid crystal panel 112. By turning the drive voltage ON/OFF at a high speed, reading electric signals from the solid-state imaging device in synchronization therewith and combining pieces of image information obtained from the ON state and the OFF state, respectively, it becomes possible to improve the image resolution up to a level equivalent to that obtained with a solid-state imaging device having twice as many pixels and the same size. The resolution is raised in this manner, so that a high-resolution image can be obtained easily even when a part of the obtained image is cut out and enlarged (zoomed).

In the pixel shifting according to the above-described method, by simply controlling ON/OFF states electrically, the subject image can be shifted very stably and at a high speed without using a mechanical driving part such as an actuator or a complex mechanism. JP 4(1992)-63074 A discloses a method of performing the pixel shifting two-dimensionally using this principle.

Further, JP 61(1986)-247168 A also discloses a similar method. In this document, although no optical element is clearly described, a polarizer is essential because a linearly polarized light beam is made to enter.

However, since all the methods disclosed in the above-mentioned three documents use a linearly polarized light beam, light components other than the linearly polarized light component in the light beam from the subject are lost. As a result, the subject image formed on the solid-state imaging device becomes dark, so that a S/N ratio lowers, resulting in an image with notable noise. Particularly when shooting a subject in a low light scene, the degradation of image quality becomes conspicuous.

SUMMARY OF THE INVENTION

It is an object of the present invention to solve the problems described above and to provide an imaging method and an imaging apparatus that can guide a light beam from a subject to a solid-state imaging device with substantially no loss and achieve a stable and high-speed pixel shifting (shifting of a subject image), thereby obtaining an image with a high resolution and a reduced noise.

An imaging method according to the present invention is an imaging method by which a relative positional relationship between a subject image formed on a solid-state imaging device and pixels in the solid-state imaging device is changed time-wise by an odd multiple of a half of an array pitch of the pixels so as to obtain a high-resolution image. The imaging method includes switching time-wise between a first time period for splitting a light beam from a subject into a plurality of light beams that have different polarization directions and then combining the plurality of light beams to form a single subject image on the solid-state imaging device and a second time period for splitting the light beam from the subject into the plurality of light beams that have different polarization directions and forming a plurality of subject images that overlap each other partially on the solid-state imaging device, obtaining a first image information on the single subject image based on pieces of signal information on the light beam reaching the pixels in the solid-state imaging device in the first time period, calculating a second image information on one of the plurality of subject images by using and computing pieces of signal information on the light beams reaching the pixels in the solid-state imaging device in the second time period, and using the first image information and the second image information to obtain a high-resolution image of the subject. In the present invention, the "high-resolution image of the subject" refers to a subject image formed by pixels whose number is larger than the number of pixels of the solid-state imaging device.

Further, an imaging apparatus according to the present invention includes a first optical system including a first transparent element and a second transparent element for shifting a traveling path of a light beam according to its polarization direction by a birefringent effect, and a first liquid crystal panel that is arranged between the first transparent element and the second transparent element and rotates a transmitted light beam according to ON/OFF of a voltage to be applied thereto, a solid-state imaging device, and a first voltage control system for controlling the voltage to be applied to the first liquid crystal panel. A light beam from a subject passes through the first optical system and forms an image as a subject image on the solid-state imaging device, and by switching between ON/OFF of the voltage to be applied to the first liquid crystal panel, a single subject image and partially-overlapping first and second subject images are formed alternately on the solid-state imaging device.

DESCRIPTION OF THE PREFERRED EMBODIMENTS

In accordance with the present invention, there is no need for using a polarizer, which was essential in a conventional pixel shifting method. Therefore, it is possible to perform a pixel shifting (shifting of a subject image) stably and at a high speed with substantially no loss of light from the subject. Consequently, an image with a reduced noise and a high resolution can be obtained. This makes it possible to provide a high-performance camera module.

Furthermore, simply by controlling ON/OFF of the voltage to be applied to the liquid crystal panel, the imaging apparatus of the present invention can perform image formation, while switching between the single subject image and the two partially-overlapping subject images at a high speed in an accurate and stable manner.

In the above-described imaging method according to the present invention, the second image information can be calculated by using a piece of signal information from a pixel at which only one of the plurality of subject images is formed.

Alternatively, the second image information may be calculated by extracting an area including a plurality of pixels adjacent to each other from which equivalent pieces of signal information are obtained in the first time period, and assuming that respective pieces of signal information in the plurality of pixels in the area among the pieces of signal information in the second time period immediately after the first time period are equal to each other, computing the pieces of signal information in the second time period.

With either of the above, the second image information on one of the partially-overlapping subject images can be obtained easily by computing the intensity distribution information of the light beam entering the solid-state imaging device in the second time period.

Also, in the above-described imaging apparatus according to the present invention, it is preferable that the first transparent element splits the light beam from the subject into two polarized light beams that have different polarization directions and spaces traveling paths of the two polarized light beams away from each other by a distance D, the first liquid crystal panel rotates the polarization directions of the two polarized light beams that have left the first transparent element by 0° or 90° according to the voltage to be applied, the second transparent element shifts one of the traveling paths of the two polarized light beams that have left the first liquid crystal panel according to their polarization directions so as to match the traveling paths of the two polarized light beams or expand a space between the traveling paths of the two polarized light beams to a distance 2D, and the solid-state imaging device reads out a light intensity distribution formed by the two polarized light beams that have left the second transparent element. This makes it possible to form the single subject image and the partially-overlapping two subject images at desired positions respectively on the solid-state imaging device.

In this case, it is preferable further to include a signal processing circuit for using the light intensity distribution formed by the two polarized light beams that have the space between the traveling paths expanded to the distance 2D so as to calculate a light intensity distribution of one of the two polarized light beams, and using this light intensity distribution and the light intensity distribution formed by the two polarized light beams whose traveling paths are matched so as to compute and obtain a light intensity distribution of the image of the subject. In this way, the pixel shifting can be achieved easily with substantially no loss of light from the subject.

It is preferable that the above-described imaging apparatus according to the present invention further includes a second optical system including a third transparent element and a fourth transparent element for shifting a traveling path of a light beam according to its polarization direction by a birefringent effect, and a second liquid crystal panel that is arranged between the third transparent element and the fourth transparent element and rotates a transmitted light beam according to ON/OFF of a voltage to be applied thereto, and a second voltage control system for controlling the voltage to be applied to the second liquid crystal panel, wherein the light beam from the subject passes through the first optical system and the second optical system and forms an image as a subject image on the solid-state imaging device, and by switching between ON/OFF of the voltage to be applied respectively to the first liquid crystal panel and the second liquid crystal panel, the single subject image, the first and second subject images that are at different positions in a first direction and third and fourth subject images that are at different positions in a second direction different from the first direction are formed sequentially on the solid-state imaging device. In this manner, high-resolution image information can be obtained two-dimensionally.

It is preferable that the first transparent element and the second transparent element are obliquely deposited metal oxide films. It also is preferable that the third transparent element and the fourth transparent element are obliquely deposited metal oxide films. This makes it possible to achieve a low-cost and thin optical system.

It is preferable that the first liquid crystal panel is a twisted nematic liquid crystal panel. It also is preferable that the second liquid crystal panel is a twisted nematic liquid crystal panel. This makes it possible to switch stably at a high speed between transmitting an incident polarized light beam without changing its polarization direction and transmitting the same while rotating its polarization direction by 90°.

It is preferable that the solid-state imaging device is a MOS sensor. This allows a high-speed computation for each pixel.

The following is a detailed description of the present invention, with reference to preferred embodiments.

First Embodiment

Figure 1:
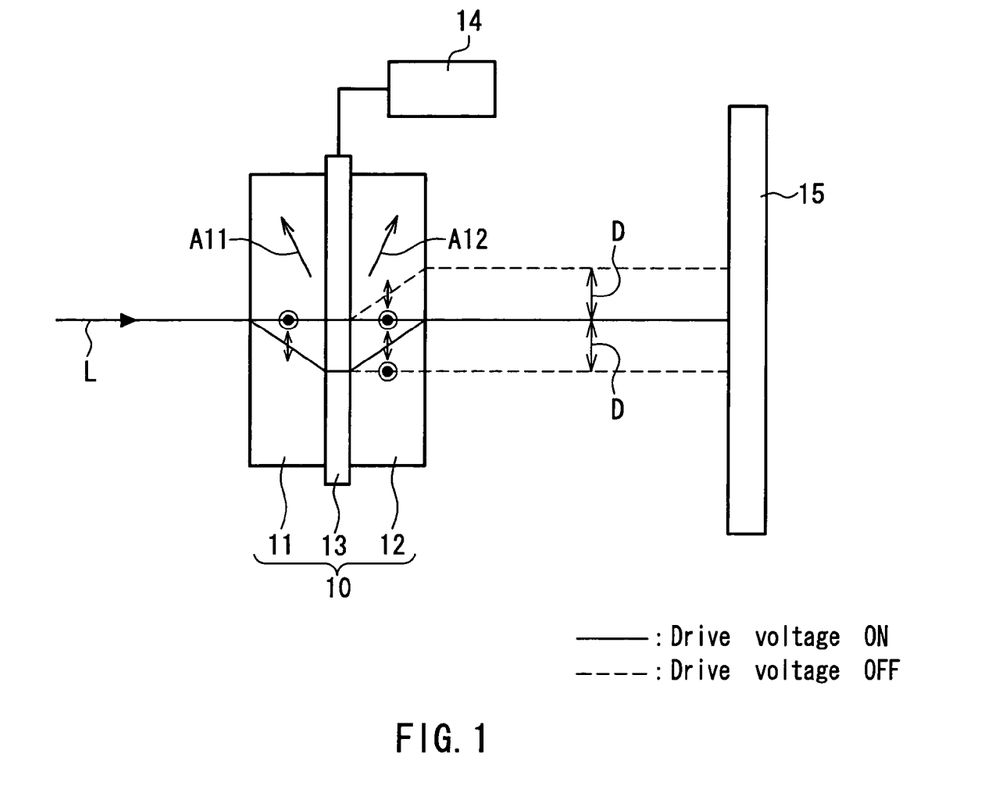
FIG. 1 is a structural view showing an imaging apparatus according to a first embodiment of the present invention.

FIG. 1 shows a major portion of an imaging apparatus according to the first embodiment of the present invention. The imaging apparatus of the present embodiment includes an optical system 10 having a first quartz-crystal plate 11, a second quartz-crystal plate 12 and a liquid crystal panel 13 arranged therebetween. As shown in the figure, the first quartz-crystal plate 11 and the second quartz-crystal plate 12 respectively have optical axes A11 and A12 that are plane-symmetrical with respect to the liquid crystal panel 13. The liquid crystal panel 13 is disposed between the quartz-crystal plates 11 and 12 described above and includes electrodes facing each other (not shown). A voltage control portion 14 controls ON/OFF of a voltage to be applied to the liquid crystal panel 13.

The quartz-crystal plates 11 and 12 have the same thickness and are ground at the same angle, i.e., 44°50' with respect to the respective optical axes A11 and A12. In a light beam that enters perpendicularly to an incident surface of each of the quartz-crystal plates 11 and 12, a light component whose polarization direction is perpendicular to a surface of a sheet passes through the incident surface as an ordinary light beam with its path remaining unchanged, whereas a light component whose polarization direction is parallel with the surface of the sheet is bent obliquely at each incident surface and passes obliquely through each of the quartz-crystal plates 11 and 12 as an extraordinary light beam. Then, the light beam that has passed obliquely through each of the quartz-crystal plates 11 and 12 is bent at an outgoing surface in a direction opposite to that at the incident surface and leaves as a light beam parallel with the incident light beam. In other words, the light beam entering the quartz-crystal plates 11 and 12 is split according to its polarization direction into a light beam traveling straight and a light beam whose traveling path is shifted so as to be parallel with this straight light beam.

FIG. 1 does not show any optical systems such as a lens or mechanisms associated therewith.

The light beam L from the subject usually enters the imaging apparatus in an unpolarized state. In FIG. 1, the light beam L that has entered the first quartz-crystal plate 11 in the unpolarized state from the left side of the sheet is split into two light beams according to its polarization direction as described above, and each light beam reaches the liquid crystal panel 13. The liquid crystal panel 13 is a twisted nematic liquid crystal panel. When the drive voltage from the voltage control portion 14 is ON, the liquid crystal panel 13 does not change the polarization direction of the light beam. Thus, the two light beams that have been split by the first quartz-crystal plate 11 enter the second quartz-crystal plate 12 and then travel along respective paths indicated by solid lines. On the other hand, when the drive voltage from the voltage control portion 14 is OFF, a liquid crystal sealed in the liquid crystal panel 13 rotates the polarization direction of the light beam by 90°. Thus, the two light beams that have been split by the first quartz-crystal plate 11 enter the second quartz-crystal plate 12 and then travel along respective paths indicated by broken lines.

In other words, when the drive voltage is ON, the two light beams split by the first quartz-crystal plate 11 are combined by the second quartz-crystal plate 12, so that one subject image is formed on a solid-state imaging device 15. On the other hand, when the drive voltage is OFF, the two light beams split by the first quartz-crystal plate 11 form two partially-overlapping subject images on the solid-state imaging device 15. These two subject images in the OFF state respectively are displaced by an equal distance D upwardly and downwardly in FIG. 1 from the one image in the ON state.

Here, the thickness of each of the quartz-crystal plates 11 and 12 is adjusted so that the displaced amount D on the solid-state imaging device 15 between the image forming position of the light beam indicated by the solid line and each of the image forming positions of the light beams indicated by the broken lines is ½ of the pixel pitch of the solid-state imaging device 15. At this time, the displaced amount 2D between the image forming positions of the two light beams split according to the polarization direction, which are indicated by the broken lines, is equal to the pixel pitch. In the case of using a solid-state imaging device having a pixel pitch of 2.5 μm, for example, such a condition can be achieved by setting the thicknesses of the first and second quartz-crystal plates 11 and 12 to be about 213 μm, respectively. In the present embodiment, the displaced amount D between the image forming position of the light beam indicated by the solid line and that of each of the light beams indicated by the broken lines is set to be ½ of the pixel pitch. However, the present invention is not limited to this structure. The displaced amount D also may be an odd multiple of ½ of the pixel pitch, e.g., ³⁄₂, ⁵⁄₂ or ⁷⁄₂ times the pixel pitch.

In the following, an imaging method using such an imaging apparatus will be described. Using the imaging apparatus shown in FIG. 1, the voltage control portion 14 repeatedly switches the drive voltage to be applied to the liquid crystal panel 13 ON/OFF at a high speed, and in synchronization with this switching ON/OFF, electric signals from the solid-state imaging device 15 are read out for each frame. The drive voltage to the liquid crystal panel 13 can be switched at every several hundredths of a second, for example.

When the drive voltage is ON, the light beam travels along the path indicated by the solid line, so that one subject image is formed on the solid-state imaging device 15. In this case, signal information on the light beam reaching each pixel in the solid-state imaging device 15 is fetched as it is, and its data are stored as first image information.

On the other hand, when the drive voltage is OFF, the light beams travel along the paths indicated by the broken lines, so that two identical subject images that overlap each other partially are formed on the solid-state imaging device 15. This state corresponds to so-called "double exposure." Pieces of image information obtained from the solid-state imaging device 15 in this state contain pieces of image information on the subject images that are each displaced by a half pixel pitch from the one subject image obtained immediately before this when the drive voltage is ON. In other words, the pieces of image information obtained when the drive voltage is OFF contain the pieces of image information between the pixels of the first image information obtained when the drive voltage is ON. Therefore, by reproducing image information on either of the subject images (second image information) from the image information on the two subject images that are double-exposed in the OFF state and superimposing this image information onto the above-noted first image information in the ON state, it becomes possible to achieve high-resolution image information having twice as many pixels as the solid-state imaging device 15.

Figure 2A:
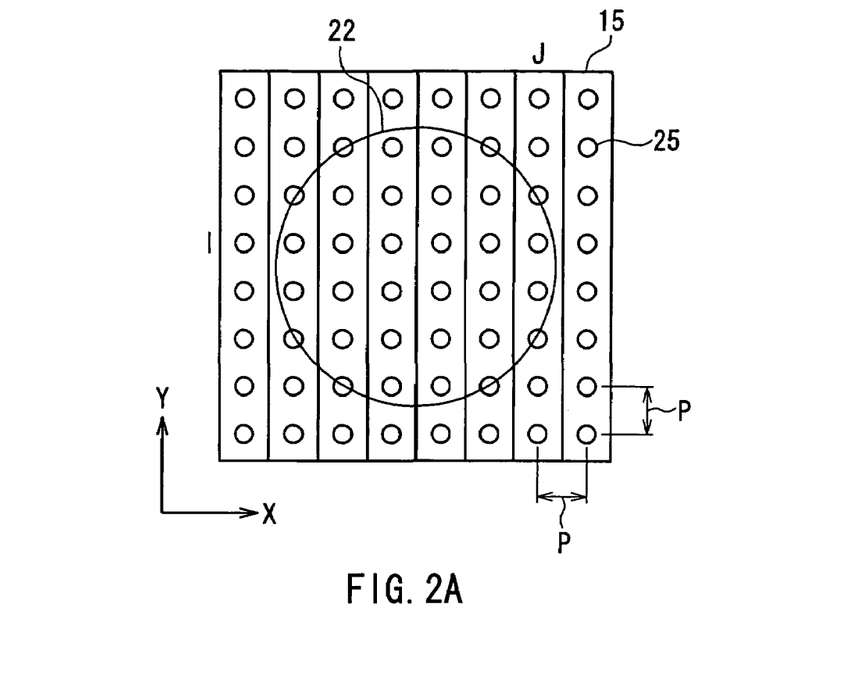
FIG. 2A shows how one subject image is formed on a solid-state imaging device when a voltage applied to a liquid crystal panel is ON in an imaging method according to the first embodiment of the present invention.
Figure 2B:
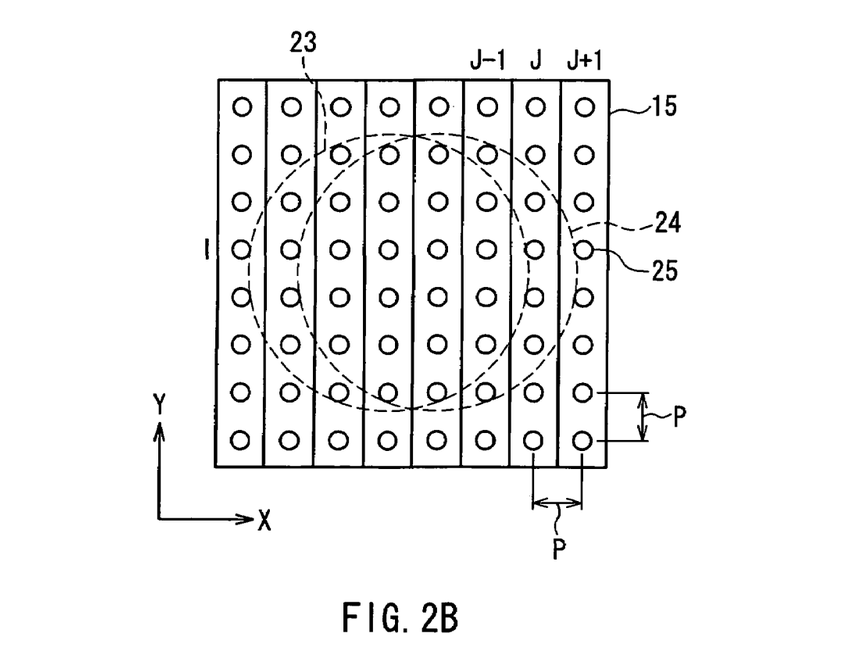
FIG. 2B shows how two double-exposed subject images are formed on the solid-state imaging device when the voltage applied to the liquid crystal panel is OFF in the imaging method according to the first embodiment of the present invention.

Referring to FIGS. 2A and 2B, how to reproduce the image information on one of the subject images from the image information on the two subject images that are double-exposed in the OFF state will be explained. FIGS. 2A and 2B are views showing the solid-state imaging device 15 seen from the subject side.

When the drive voltage to the liquid crystal panel 13 is ON, one subject image 22 is formed alone on the solid-state imaging device 15 as shown in FIG. 2A.

When the drive voltage to the liquid crystal panel 13 is OFF, two subject images 23 and 24 that are double-exposed are formed on the solid-state imaging device 15 as shown in FIG. 2B. In this case, the subject images 23 and 24 are set to be smaller than a sensing area of the solid-state imaging device 15.

In FIGS. 2A and 2B, the numerous small circles 25 indicate pixels of the solid-state imaging device 15 and are arranged at an array pitch P along an X axis and a Y axis.

As described referring to FIG. 1, the image information on the subject image 22 is fetched as it is as the first image information in the frame shown in FIG. 2A.

In the frame shown in FIG. 2B, the subject images 23 and 24 are displaced toward opposite sides along the X-axis direction by a half of the pixel pitch P from the subject image 22 shown in FIG. 2A. In other words, the subject images 23 and 24 are displaced from each other along the X-axis direction by the pixel pitch P. In a general use, since the light intensity in each polarization direction is the same, the subject images 23 and 24 also have the same light intensity.

First, in FIG. 2B, among pixels in a row I parallel with the X axis, attention is directed to a pixel (I, J) that the light beam forming the subject image 23 does not enter and only the light beam forming the subject image 24 enters. Here, the pixel (I, J) represents a pixel at an intersection of the row I and a column J. In the case where the subject images 23 and 24 respectively are shifted in the X-axis direction by a half pixel pitch from the subject image 22 as in the present embodiment, neither the subject image 23 nor the subject image 24 is formed at a pixel (I, J+1) adjacent to the pixel (I, J) on the right side along the X-axis direction, so that no signal is generated. On the other hand, the subject images 23 and 24 overlap each other at an adjacent pixel (I, J−1) on the left side along the X-axis direction.

In the state shown in FIG. 2B, assuming that the subject image 24 alone were formed virtually on the solid-state imaging device 15, a signal strength by the subject image 24 at a pixel (I, n) at a certain moment is defined as P (I, n). Also, when the subject images 23 and 24 actually are double-exposed on the solid-state imaging device 15, a signal strength at the pixel (I, n) at the same moment is defined as Q (I, n). Here, n is a natural number. Now, $$Q(I, n-1) = P(I, n-1) + P(I, n) \quad (1)$$

is satisfied. Further, since the signal of only the subject image 24 is obtained at the pixel (I, J) as described above, $$Q(I, J) = P(I, J) \quad (2)$$

is satisfied.

Since the signal strength Q (I, n) when the subject images 23 and 24 are double-exposed on the solid-state imaging device 15 is detectable signal information, Equation (1) and Equation (2) can be used to calculate P (I, J−1), P (I, J−2), ... sequentially from P (I, J), i.e., Q (I, J) with respect to each pixel on the row I, thereby obtaining all the signal information on the subject image 24 at each pixel on the row I. For each pixel on individual rows other than the row I on which the subject image 24 is formed, the signal information also can be obtained in a similar manner. As a result, from the image information on the two double-exposed subject images 23 and 24, the image information on one subject image 24 (the second image information) can be obtained.

The subject images 23 and 24 both have about a half light amount of the subject image 22. Thus, the second image information on the reproduced subject image 24 is amplified twofold and combined with the first image information on the subject image 22 that has been fetched in the frame shown in FIG. 2A. In this way, it is possible to obtain image information whose pixels are doubled in a pseudo manner in the X-axis direction.

In FIG. 2B, in order to find the pixel (I, J) on the row I that receives only the light beam forming one of the double-exposed subject images, it is appropriate to follow the procedures below. The light signal strength of each pixel is examined sequentially along the row I from the pixel on the row I that receives the light beam actually. When the first pixel whose light signal strength is zero (the pixel (I, J+1) in FIG. 2B) is found, a pixel immediately before this pixel corresponds to the pixel that receives only the light beam forming one of the subject images (the pixel (I, J) in FIG. 2B).

The above computation is carried out by a signal processing circuit (not shown) connected to the solid-state imaging device 15.

The use of a MOS-type solid-state imaging device as the solid-state imaging device 15 is particularly desirable because it allows a high-speed computation of fetching the signal from each pixel.

The above description has been directed to an example in which the displaced amount D of the subject images 23 and 24 in FIG. 2B with respect to the subject image 22 in FIG. 2A is a half of the pixel pitch P of the solid-state imaging device 15. However, the present invention is not limited to the above but can produce a similar effect as long as the displaced amount D is an odd multiple of the half of the pixel pitch P. When the displaced amount D is L times the half of the pixel pitch P (where L is an odd number), Equation (1) above becomes $$Q(I, n-L)=P(I, n-L)+P(I, n) \quad (3)$$

and Equation (2) above becomes $$Q(I, J)=P(I, J)$$

$$Q(I, J-1)=P(I, J-1)$$

. . .

. . .

$$Q(I, J-L)=P(I, J-L). \quad (4)$$

As L becomes larger, the number of pixels that receives only the light beam forming one of the two subject images at the time of double exposure increases. However, according to the value of L, the quartz-crystal plates 11 and 12 in FIG. 1 have to be made L times as thick as those in the case of L=1. Thus, it is appropriate to select L in view of the thickness that can be processed easily as a quartz-crystal plate.

By using a white LED as a light source illuminating the subject and allowing the illuminating light source to blink in synchronization with ON/OFF of the voltage applied to the liquid crystal panel 13, it is possible to raise an S/N ratio (a ratio of signal strength to noise), which brings about an effective result.

Second Embodiment

Figure 3:
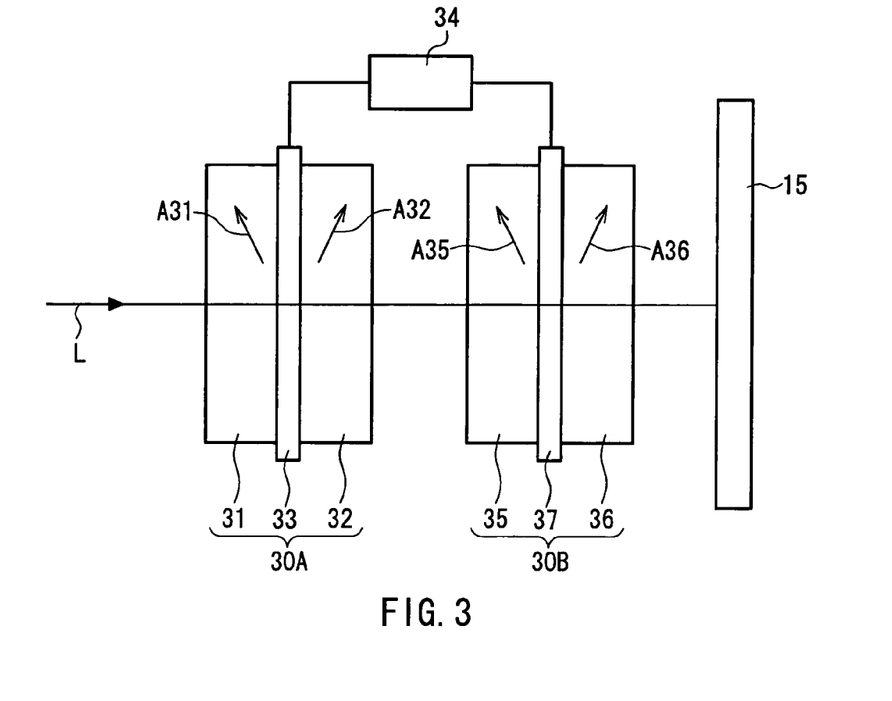
FIG. 3 is a structural view showing an imaging apparatus according to a second embodiment of the present invention.

FIG. 3 shows a major portion of an imaging apparatus according to the second embodiment of the present invention. The imaging apparatus of the present embodiment includes a first optical system 30A having a first quartz-crystal plate 31, a second quartz-crystal plate 32 and a first liquid crystal panel 33 arranged therebetween, and a second optical system 30B having a third quartz-crystal plate 35, a fourth quartz-crystal plate 36 and a second liquid crystal panel 37 arranged therebetween.

As shown in the figure, the first quartz-crystal plate 31 and the second quartz-crystal plate 32 respectively have optical axes A31 and A32 that are plane-symmetrical with respect to the first liquid crystal panel 33. The first liquid crystal panel 33 is disposed between the first quartz-crystal plate 31 and the second quartz-crystal plate 32 described above and includes electrodes facing each other (not shown).

The second optical system 30B constituted by the third quartz-crystal plate 35, the fourth quartz-crystal plate 36 and the second liquid crystal panel 37 has the same structure as that obtained by rotating the above-described first optical system 30A including the first quartz-crystal plate 31, the second quartz-crystal plate 32 and the first liquid crystal panel 33 by 90° around the optical axis.

A voltage control portion 34 controls ON/OFF of the voltage to be applied to the first liquid crystal panel 33 and the second liquid crystal panel 37.

The quartz-crystal plates 31, 32, 35 and 36 have the same thickness and are ground at the same angle, i.e., 44°50' with respect to the respective optical axes A31, A32, A35 and A36.

The voltage control portion 34 carries out the voltage control for each frame as shown in Table 1, thereby achieving not only the double exposure (pixel shifting) in the X-axis direction as shown in FIG. 2B but also the double exposure (pixel shifting) in the Y-axis direction.

TABLE 1

| Frame number | Driving condition | Subject image |
| --- | --- | --- |
| 1 | First liquid crystal panel ON<br>Second liquid crystal panel ON | One subject image |
| 2 | First liquid crystal panel OFF<br>Second liquid crystal panel ON | Double exposure in X-axis direction |
| 3 | First liquid crystal panel ON<br>Second liquid crystal panel ON | One subject image |
| 4 | First liquid crystal panel ON<br>Second liquid crystal panel OFF | Double exposure in Y-axis direction |

The voltage is controlled for each frame from a frame number 1 to a frame number 4 in Table 1, and a signal is fetched from the solid-state imaging device 15 in each frame. Although the subject images are double-exposed in the frame 2 and the frame 4, the image information on a single subject image can be reproduced by the method described in the first embodiment. This image information is combined with the image information obtained in the frame 1 and/or the frame 3.

As described above, the present embodiment is directed to the pixel shifting performed two-dimensionally in the X-axis direction and the Y-axis direction. This makes it possible to obtain the image information whose pixels are doubled in a pseudo manner in the X-axis direction and the Y-axis direction, respectively. In other words, a higher resolution can be achieved two-dimensionally.

Although the first liquid crystal panel 33 and the second liquid crystal panel 37 are driven by the common voltage control portion 34 in the above example, they also may be driven by different voltage control portions.

Third Embodiment

Figure 4:
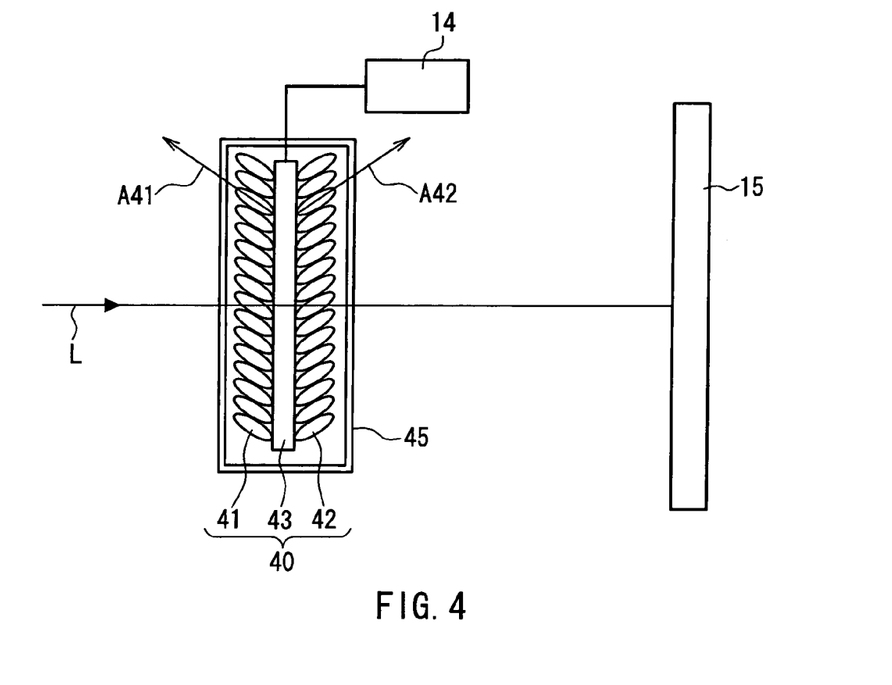
FIG. 4 is a structural view showing an imaging apparatus according to a third embodiment of the present invention.

FIG. 4 shows a major portion of an imaging apparatus according to the third embodiment of the present invention. In the present embodiment, the first quartz-crystal plate 11 and the second quartz-crystal plate 12 in the first embodiment are replaced by a first obliquely deposited film 41 and a second obliquely deposited film 42. The imaging apparatus according to the present embodiment includes a block-like optical system 40 in which a liquid crystal panel 43 sandwiched from both sides by the first obliquely deposited film 41 and the second obliquely deposited film 42 is sealed in a transparent cell 45, and operates similarly to the imaging apparatus in the first embodiment.

As shown in the figure, the first obliquely deposited film 41 and the second obliquely deposited film 42 respectively have optical axes A41 and A42 that are plane-symmetrical with respect to the liquid crystal panel 43, have a birefringence and function similarly to the first quartz-crystal plate 11 and the second quartz-crystal plate 12 in FIG. 1. Although the first obliquely deposited film 41 and the second obliquely deposited film 42 are formed directly on the liquid crystal panel 43 in FIG. 4, they also may be formed on a sheet or a substrate, which then is attached to the liquid crystal panel 43.

The obliquely deposited films 41 and 42 may be obtained by being formed on a substrate from an oblique direction by vacuum deposition. A heavy metal oxide such as tantalum oxide, tungsten oxide or titanium oxide as a film material is fused by an electron beam, deposited at room temperature while introducing an oxygen gas into a film forming tank as necessary, so that the film material turns into a transparent oblique columnar shape as shown in FIG. 4 and adheres to the substrate. Since the film density differs between the direction of the optical axis A41, A42 and directions perpendicular thereto (a direction within the surface of the sheet of FIG. 4 and a direction normal to this surface), the difference in refractive index also arises. In other words, the obliquely deposited films 41 and 42 have a birefringence in which the refractive indices in three axial directions are different, similarly to a biaxial crystal.

For example, when tantalum oxide is deposited on the substrate from a direction at about 70° to a normal line of the substrate, the resultant film is formed of many columns tilted by 30° to 35° with respect to the normal line of the substrate. The film has a birefringence ($\Delta n$) of about 0.08. This is much larger than the birefringence of quartz crystal, which is 0.01. This means that the use of the obliquely deposited film allows an extremely small thickness for obtaining an equivalent retardation.

For example, in the case where a solid-state imaging device 15 having a pixel pitch of 2.5 µm is used to shift the image forming position by a half of the pixel pitch as described in the first embodiment, a quartz-crystal plate has to be at least 200 µm thick as described in the first embodiment. On the other hand, a tantalum oxide obliquely deposited film even can be a little thinner than 30 µm. It is easily possible to form an obliquely deposited film with such a thickness. Also, a mass production thereof is possible.

However, there is a problem in that the obliquely deposited film has a birefringence that tends to vary according to changes in environment, especially in humidity. When the humidity is high, water molecules get in the gap inside the obliquely deposited film, thus lowering its birefringence. Conversely, when the humidity decreases, the birefringence rises.

As shown in FIG. 4, the obliquely deposited films 41 and 42 are sealed by the transparent cell 45, thereby stabilizing the birefringence of the obliquely deposited films 41 and 42. It should be noted that the sealing method is not limited to this but may be by forming a protective layer on the film surface or by attaching a protective sheet to the film surface.

As described above, the obliquely deposited films 41 and 42 are used as elements for shifting by their birefringent effect the traveling path of a light beam according to its polarization direction, thus enhancing cost effectiveness of the apparatus compared with the case of using a quartz-crystal plate.

Fourth Embodiment

Figure 5:
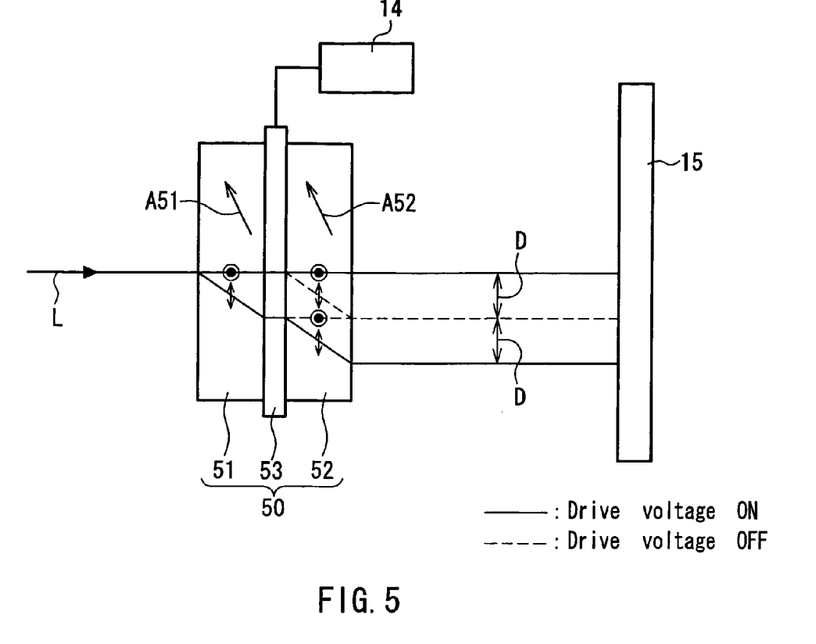
FIG. 5 is a structural view showing an imaging apparatus according to a fourth embodiment of the present invention.

FIG. 5 shows a major portion of an imaging apparatus according to the fourth embodiment of the present invention. The imaging apparatus of the present embodiment includes an optical system 50 having a first quartz-crystal plate 51, a second quartz-crystal plate 52 and a liquid crystal panel 53 arranged therebetween. In the first embodiment described above (see FIG. 1), the first quartz-crystal plate 11 and the second quartz-crystal plate 12 have the optical axes A11 and A12 that are plane-symmetrical with respect to the liquid crystal panel 13. However, in the present embodiment, an optical axis A51 of the first quartz-crystal plate 51 and an optical axis A52 of the second quartz-crystal plate 52 are parallel with each other. Other than the above, this imaging apparatus is similar to the imaging apparatus according to the first embodiment.

In the present embodiment, when a drive voltage to be applied to the liquid crystal panel 53 is OFF, two light beams that have been split by the first quartz-crystal plate 51 travel along paths indicated by broken lines, so that one subject image is formed on the solid-state imaging device 15. In this case, signal information on the light beam reaching each pixel in the solid-state imaging device 15 is fetched as it is, and its data are stored as first image information.

On the other hand, when the drive voltage to be applied to the liquid crystal panel 53 is ON, the two light beams split by the first quartz-crystal plate 51 form two partially-overlapping subject images on the solid-state imaging device 15. These two subject images in the ON state respectively are displaced by an equal distance D upwardly and downwardly in FIG. 5 from the one image in the OFF state.

Similarly to the first embodiment described above, image information on either of the subject images (second image information) is reproduced from the image information on the two double-exposed subject images in the ON state and then superimposed onto the above-noted first image information in the OFF state. In this way, it is possible to achieve high-resolution image information having twice as many pixels as the solid-state imaging device 15.

Fifth Embodiment

Figure 6:
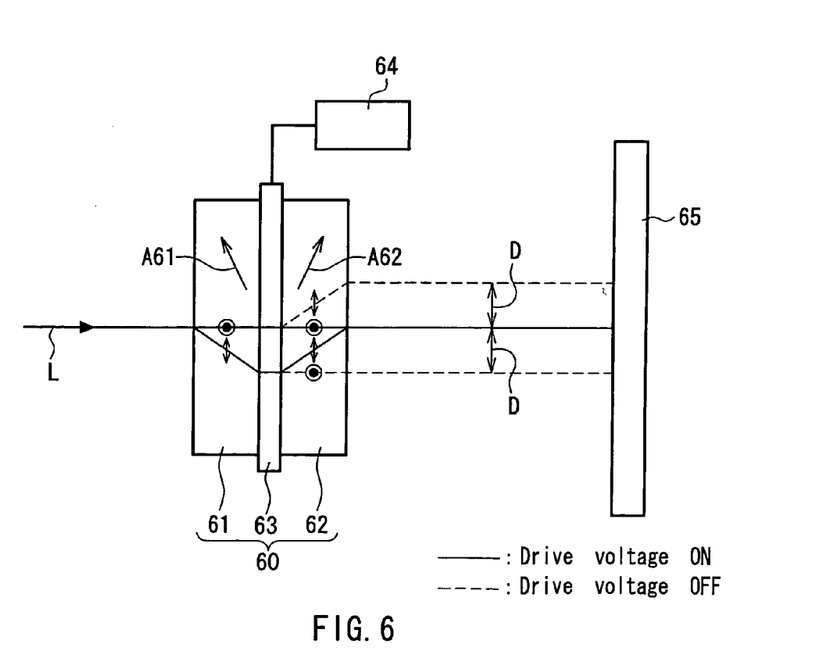
FIG. 6 is a structural view showing an imaging apparatus according to a fifth embodiment of the present invention.

FIG. 6 shows a major portion of an imaging apparatus according to the fifth embodiment of the present invention. The imaging apparatus of the present embodiment includes an optical system 60 having a first quartz-crystal plate 61, a second quartz-crystal plate 62 and a liquid crystal panel 63 arranged therebetween. As shown in the figure, the first quartz-crystal plate 61 and the second quartz-crystal plate 62 respectively have optical axes A61 and A62 that are plane-symmetrical with respect to the liquid crystal panel 63. The liquid crystal panel 63 is disposed between the quartz-crystal plates 61 and 62 described above and includes electrodes facing each other (not shown). A voltage control portion 64 controls ON/OFF of a voltage to be applied to the liquid crystal panel 63.

The quartz-crystal plates 61 and 62 have the same thickness and are ground at the same angle, i.e., 44°50' with respect to the respective optical axes A61 and A62. In a light beam that enters perpendicularly to an incident surface of each of the quartz-crystal plates 61 and 62, a light component whose polarization direction is perpendicular to a surface of a sheet passes through the incident surface as an ordinary light beam with its path remaining unchanged, whereas a light component whose polarization direction is parallel with the surface of the sheet is bent obliquely at each incident surface and passes obliquely through each of the quartz-crystal plates 61 and 62 as an extraordinary light beam. Then, the light beam that has passed obliquely through each of the quartz-crystal plates 61 and 62 is bent at an outgoing surface in a direction opposite to that at the incident surface and leaves as a light beam parallel with the incident light beam. In other words, the light beam entering the quartz-crystal plates 61 and 62 is split according to its polarization direction into a light beam traveling straight and a light beam whose traveling path is shifted so as to be parallel with this straight light beam.

FIG. 6 does not show any optical systems such as a lens or mechanisms associated therewith.

The light beam L from the subject usually enters the imaging apparatus in an unpolarized state. In FIG. 6, the light beam L that has entered the first quartz-crystal plate 61 in the unpolarized state from the left side of the sheet is split into two light beams according to its polarization direction as described above, and each light beam reaches the liquid crystal panel 63. The liquid crystal panel 63 is a twisted nematic liquid crystal panel. When the drive voltage from the voltage control portion 64 is ON, the liquid crystal panel 63 does not change the polarization direction of the light beam. Thus, the two light beams that have been split by the first quartz-crystal plate 61 enter the second quartz-crystal plate 62 and then travel along respective paths indicated by solid lines. On the other hand, when the drive voltage from the voltage control portion 64 is OFF, a liquid crystal sealed in the liquid crystal panel 63 rotates the polarization direction of the light beam by 90°. Thus, the two light beams that have been split by the first quartz-crystal plate 61 enter the second quartz-crystal plate 62 and then travel along respective paths indicated by broken lines.

In other words, when the drive voltage is ON, the two light beams split by the first quartz-crystal plate 61 are combined by the second quartz-crystal plate 62, so that one subject image is formed on a solid-state imaging device 65. On the other hand, when the drive voltage is OFF, the two light beams split by the first quartz-crystal plate 61 form two partially-overlapping subject images on the solid-state imaging device 65. These two subject images in the OFF state respectively are displaced by an equal distance D upwardly and downwardly in FIG. 6 from the one image in the ON state.

Here, the thickness of each of the quartz-crystal plates 61 and 62 is adjusted so that the displaced amount D on the solid-state imaging device 65 between the image forming position of the light beam indicated by the solid line and each of the image forming positions of the light beams indicated by the broken lines is ½ of the pixel pitch of the solid-state imaging device 65. At this time, the displaced amount 2D between the image forming positions of the two light beams split according to the polarization direction, which are indicated by the broken lines, is equal to the pixel pitch. In the case of using a solid-state imaging device having a pixel pitch of 2.5 μm, for example, such a condition can be achieved by setting the thicknesses of the first and second quartz-crystal plates 61 and 62 to be about 213 μm, respectively. In the present embodiment, the displaced amount D between the image forming position of the light beam indicated by the solid line and that of each of the light beams indicated by the broken lines is set to be ½ of the pixel pitch. However, the present invention is not limited to this structure. The displaced amount D also may be an odd multiple of ½ of the pixel pitch, e.g., 3⁄2, 5⁄2 or 7⁄2 times the pixel pitch.

In the following, an imaging method using such an imaging apparatus will be described. Using the imaging apparatus shown in FIG. 6, the voltage control portion 64 repeatedly switches the drive voltage to be applied to the liquid crystal panel 63 ON/OFF at a high speed, and in synchronization with this switching ON/OFF, electric signals from the solid-state imaging device 65 are read out for each frame. The drive voltage to the liquid crystal panel 63 can be switched at every several hundredths of a second, for example.

When the drive voltage is ON, the light beam travels along the path indicated by the solid line, so that one subject image is formed on the solid-state imaging device 65. In this case, signal information on the light beam reaching each pixel in the solid-state imaging device 65 is fetched as it is, and its data are stored as first image information.

On the other hand, when the drive voltage is OFF, the light beams travel along the paths indicated by the broken lines, so that two identical subject images that overlap each other partially are formed on the solid-state imaging device 65. This state corresponds to so-called "double exposure." Pieces of image information obtained from the solid-state imaging device 65 in this state contain pieces of image information on the subject images that are each displaced by a half pixel pitch from the one subject image obtained immediately before this when the drive voltage is ON. In other words, the pieces of image information obtained when the drive voltage is OFF contain the pieces of image information between the pixels of the first image information obtained when the drive voltage is ON. Therefore, by reproducing image information on either of the subject images (second image information) from the image information on the two subject images that are double-exposed in the OFF state and superimposing this image information onto the above-noted first image information in the ON state, it becomes possible to achieve high-resolution image information having twice as many pixels as the solid-state imaging device 65.

Figure 7A:
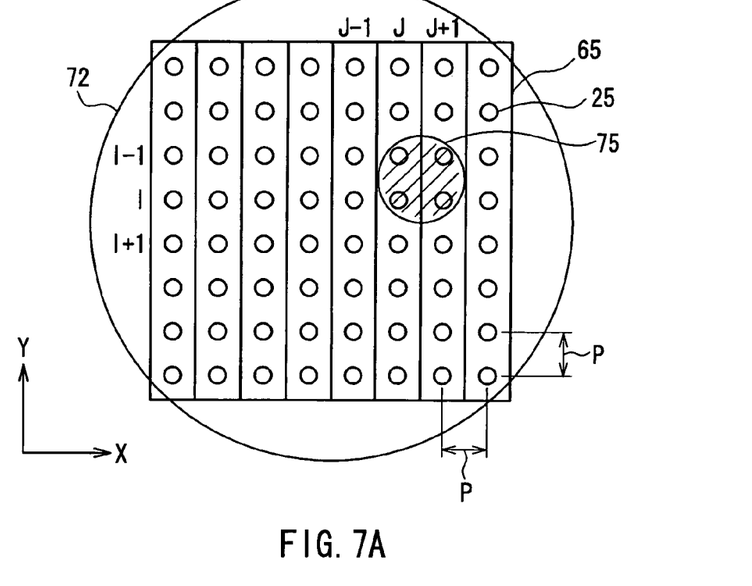
FIG. 7A shows how one subject image is formed on a solid-state imaging device when a voltage applied to a liquid crystal panel is ON in an imaging method according to the fifth embodiment of the present invention.
Figure 7B:
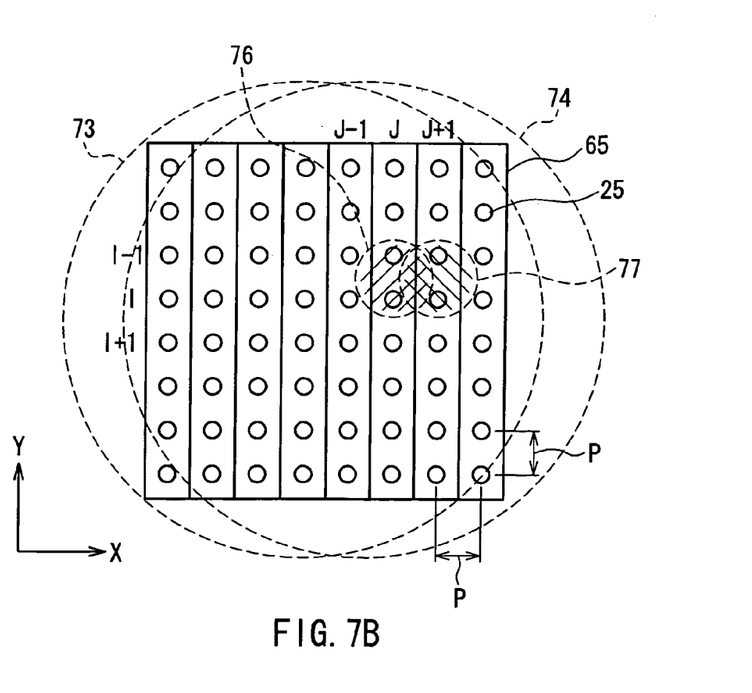
FIG. 7B shows how two double-exposed subject images are formed on the solid-state imaging device when the voltage applied to the liquid crystal panel is OFF in the imaging method according to the fifth embodiment of the present invention.

Referring to FIGS. 7A and 7B, how to reproduce the image information on one of the subject images from the image information on the two subject images that are double-exposed in the OFF state will be explained. FIGS. 7A and 7B are views showing the solid-state imaging device 65 seen from the subject side.

When the drive voltage to the liquid crystal panel 63 is ON, one subject image 72 is formed alone on the solid-state imaging device 65 as shown in FIG. 7A.

When the drive voltage to the liquid crystal panel 63 is OFF, two subject images 73 and 74 that are double-exposed are formed on the solid-state imaging device 65 as shown in FIG. 7B. In this case, the subject images 73 and 74 may be larger or smaller than a sensing area of the solid-state imaging device 65.

In FIGS. 7A and 7B, the numerous small circles 25 indicate pixels of the solid-state imaging device 65 and are arranged at an array pitch P along an X axis and a Y axis.

As described referring to FIG. 6, the image information on the subject image 72 is fetched as it is as the first image information in the frame shown in FIG. 7A.

In the frame shown in FIG. 7B, the subject images 73 and 74 are displaced toward opposite sides along the X-axis direction by a half of the pixel pitch P from the subject image 72 shown in FIG. 7A. In other words, the subject images 73 and 74 are displaced from each other along the X-axis direction by the pixel pitch P. In a general use, since the light intensity in each polarization direction is the same, the subject images 73 and 74 also have the same light intensity.

First, the first image information fetched in the frame shown in FIG. 7A will be analyzed. In a row parallel with the X-axis direction, along which the subject image is shifted, namely, each of row 1, 2, . . . , I−1, I, I+1, . . . in FIG. 7A, an area including a plurality of pixels (two pixels in the present example) adjacent to each other from which equivalent light intensity signals are obtained is extracted. For example, when respective light intensity signals of the pixel (I, J) and the pixel (I, J+1) on the row I are equal to each other in FIG. 7A, an area 75 including these two pixels is extracted.

Thereafter, the drive voltage to the liquid crystal panel 65 is turned OFF, so that the two double-exposed subject images 73 and 74 are formed as shown in FIG. 7B. A light beam emitted from a portion in the subject corresponding to the area 75 in FIG. 7A is split into a light beam entering an area 76 and that entering an area 77 in FIG. 7B. The area 76 corresponds to the subject image 73, whereas the area 77 corresponds to the subject image 74.

In the state shown in FIG. 7B, assuming that the subject image 74 alone were formed virtually on the solid-state imaging device 65, a signal strength by the subject image 74 at a pixel (M, N) at a certain moment is defined as P (M, N). Also, when the subject images 73 and 74 actually are double-exposed on the solid-state imaging device 65, a signal strength at the pixel (M, N) at the same moment is defined as Q (M, N). Now, $$Q(M, N) = P(M, N) + P(M, N+1) \quad (5)$$

is satisfied.

Since an equal light intensity signal is obtained from the pixel (I, J) and the pixel (I, J+1) adjacent to each other in the area 75 in FIG. 7A, it is very likely that the equal light intensity signal also will be obtained from a virtual pixel (I, J+0.5) between these pixels.

Further, because the voltage to be applied to the liquid crystal panel 63 is switched ON/OFF at a high speed in the imaging apparatus according to the present embodiment, it is very likely that a light intensity distribution of the subject image 72 in FIG. 7A and that of each of the subject images 73 and 74 in FIG. 7B immediately thereafter will be equal to each other.

Thus, a light beam emitted from a portion in the subject corresponding to the virtual pixel (I, J+0.5) in FIG. 7A enters the pixel (I, J) as a light beam forming the subject image 73 and enters the pixel (I, J+1) as a light beam forming the subject image 74 in FIG. 7B immediately thereafter.

Accordingly, it is very likely that the light intensity signals of the pixel (I, J) and the pixel (I, J+1) in the area 75 in FIG. 7A will be equal to each other also in the state of FIG. 7B.

Based on the above assumption, if the pixel (I, J) and the pixel (I, J+1) in the area 75 both obtain a light signal strength A in the state of FIG. 7A, $$P(I, J+1) = A/2 \quad (6)$$

is satisfied.

Since the signal strengths Q (I, 1), ..., Q (I, J), ... when the subject images 73 and 74 are double-exposed on the solid-state imaging device 65 are detectable pieces of signal information, Equation (5) and Equation (6) can be used to calculate P (I, J) and Equation (5) can be used repeatedly to calculate P (I, J−1), P (I, J−2), ..., or inversely, P (I, J+2), P (I, J+3), ..., sequentially with respect to each pixel on the row I, thereby obtaining all the signal information on the subject image 74 at each pixel on the row I. For each pixel on individual rows other than the row I on which the subject image 74 is formed, the signal information also can be obtained in a similar manner. As a result, from the image information on the two double-exposed subject images 73 and 74, the image information on one subject image 74 (the second image information) can be obtained.

The subject images 73 and 74 both have about a half light amount of the subject image 72. Thus, the second image information on the reproduced subject image 74 is amplified twofold and combined with the first image information on the subject image 72 that has been fetched in the frame shown in FIG. 7A. In this way, it is possible to obtain image information whose pixels are doubled in a pseudo manner in the X-axis direction.

The above computation is carried out by a signal processing circuit (not shown) connected to the solid-state imaging device 65.

The use of a MOS-type solid-state imaging device as the solid-state imaging device 65 is particularly desirable because it allows a high-speed computation of fetching the signal from each pixel.

The above description has been directed to an example in which the displaced amount D of the subject images 73 and 74 in FIG. 7B with respect to the subject image 72 in FIG. 7A is a half of the pixel pitch P of the solid-state imaging device 65. However, the present invention is not limited to the above but can produce a similar effect as long as the displaced amount D is an odd multiple of the half of the pixel pitch P. When the displaced amount D is L times the half of the pixel pitch P (where L is an odd number), Equation (5) above becomes $$Q(M, N-L) = P(M, N-L) + P(M, N). \quad (7)$$

By a computation similar to the above, the image information on the subject image 74 (the second image information) can be obtained.

According to the value of L, the quartz-crystal plates 61 and 62 in FIG. 6 have to be made L times as thick as those in the case of L=1. Thus, it is appropriate to select L in view of the thickness that can be processed easily as a quartz-crystal plate.

By using a white LED as a light source illuminating the subject and allowing the illuminating light source to blink in synchronization with ON/OFF of the voltage applied to the liquid crystal panel 63, it is possible to raise an S/N ratio (a ratio of signal strength to noise), which brings about an effective result.

As described earlier, the intensity of light from the subject is the same regardless of its polarization direction in a general use. The present embodiment has been described based on this assumption. If the two light beams split by the first quartz-crystal plate 61 have different transmittances at the liquid crystal panel 63 according to their polarization directions and the ON/OFF state of the drive voltage, Equations (5) and (6) noted above become Equations (8) and (9) below.

$$Q(M, N) = \alpha 1 P(M, N) + \beta 1 P(M, N+1) \quad (8)$$

$$P(I, J+1) = \alpha 2 A / (\alpha 2 + \beta 2) \quad (9)$$

Herein, in the case where a polarized light beam whose polarization direction is perpendicular to the sheet of FIG. 6 enters the liquid crystal panel 63, α1 represents the transmittance of the polarized light beam when the drive voltage to the liquid crystal panel 63 is OFF, and α2 represents that when the drive voltage is ON. Similarly, in the case where a polarized light beam whose polarization direction is parallel with the sheet of FIG. 6 enters the liquid crystal panel 63, β1 represents the transmittance of the polarized light beam when the drive voltage to the liquid crystal panel 63 is OFF, and β2 represents that when the drive voltage is ON. If the transmittance in each case actually is measured in advance, the image information on one subject image (the second image information) can be obtained from the image information on the two double-exposed subject images similarly to the above.

The above description also is applicable to the case in which the two polarized light beams split by the first quartz-crystal plate 11 have different transmittances at the liquid crystal panel 13 according to their polarization directions and the ON/OFF state of the drive voltage in the first embodiment.

Sixth Embodiment

Figure 8:
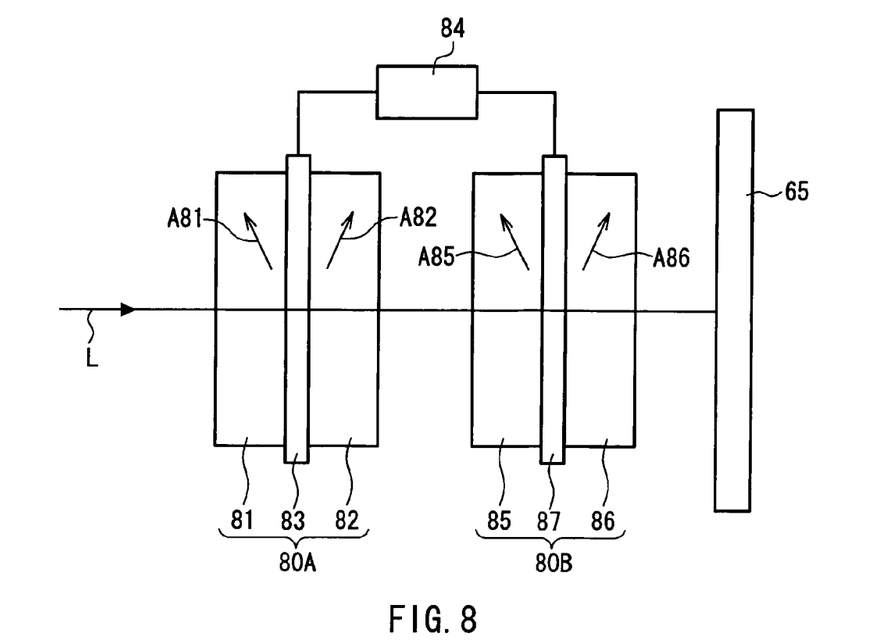
FIG. 8 is a structural view showing an imaging apparatus according to a sixth embodiment of the present invention.

FIG. 8 shows a major portion of an imaging apparatus according to the sixth embodiment of the present invention. The imaging apparatus of the present embodiment includes a first optical system 80A having a first quartz-crystal plate 81, a second quartz-crystal plate 82 and a first liquid crystal panel 83 arranged therebetween, and a second optical system 80B having a third quartz-crystal plate 85, a fourth quartz-crystal plate 86 and a second liquid crystal panel 87 arranged therebetween.

As shown in the figure, the first quartz-crystal plate 81 and the second quartz-crystal plate 82 respectively have optical axes A81 and A82 that are plane-symmetrical with respect to the first liquid crystal panel 83. The first liquid crystal panel 83 is disposed between the first quartz-crystal plate 81 and the second quartz-crystal plate 82 described above and includes electrodes facing each other (not shown).

The second optical system 80B constituted by the third quartz-crystal plate 85, the fourth quartz-crystal plate 86 and the second liquid crystal panel 87 has the same structure as that obtained by rotating the above-described first optical system 80A including the first quartz-crystal plate 81, the second quartz-crystal plate 82 and the first liquid crystal panel 83 by 90° around the optical axis.

A voltage control portion 84 controls ON/OFF of the voltage to be applied to the first liquid crystal panel 83 and the second liquid crystal panel 87.

The quartz-crystal plates 81, 82, 85 and 86 have the same thickness and are ground at the same angle, i.e., 44°50' with respect to the respective optical axes A81, A82, A85 and A86.

The voltage control portion 84 carries out the voltage control for each frame as shown in Table 2, thereby achieving not only the double exposure (pixel shifting) in the X-axis direction as shown in FIG. 7B but also the double exposure (pixel shifting) in the Y-axis direction.

TABLE 2

| Frame number | Driving condition | Subject image |
| --- | --- | --- |
| 1 | First liquid crystal panel ON<br>Second liquid crystal panel ON | One subject image |
| 2 | First liquid crystal panel OFF<br>Second liquid crystal panel ON | Double exposure in X-axis direction |
| 3 | First liquid crystal panel ON<br>Second liquid crystal panel ON | One subject image |
| 4 | First liquid crystal panel ON<br>Second liquid crystal panel OFF | Double exposure in Y-axis direction |

The voltage is controlled for each frame from a frame number 1 to a frame number 4 in Table 2, and a signal is fetched from the solid-state imaging device 65 in each frame. Although the subject images are double-exposed in the frame 2 and the frame 4, the image information on a single subject image can be reproduced by the method described in the fifth embodiment. This image information is combined with the image information obtained in the frame 1 and/or the frame 3.

As described above, the present embodiment is directed to the pixel shifting performed two-dimensionally in the X-axis direction and the Y-axis direction. This makes it possible to obtain the image information whose pixels are doubled in a pseudo manner in the X-axis direction and the Y-axis direction, respectively. In other words, a higher resolution can be achieved two-dimensionally.

Although the first liquid crystal panel 83 and the second liquid crystal panel 87 are driven by the common voltage control portion 84 in the above example, they also may be driven by different voltage control portions.

Seventh Embodiment

Figure 9:
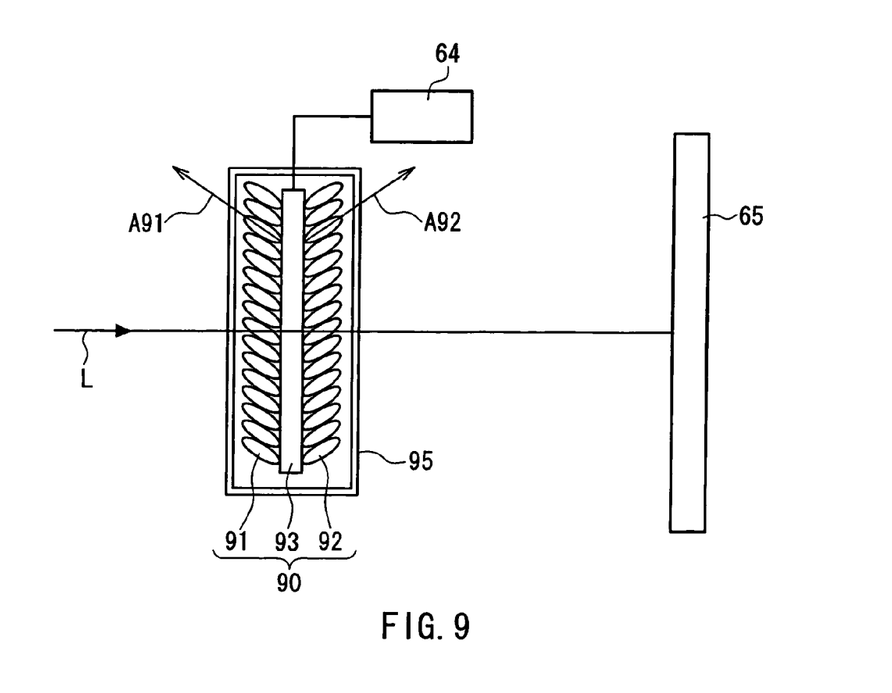
FIG. 9 is a structural view showing an imaging apparatus according to a seventh embodiment of the present invention.

FIG. 9 shows a major portion of an imaging apparatus according to the seventh embodiment of the present invention. In the present embodiment, the first quartz-crystal plate 61 and the second quartz-crystal plate 62 in the fifth embodiment are replaced by a first obliquely deposited film 91 and a second obliquely deposited film 92. The imaging apparatus according to the present embodiment includes a block-like optical system 90 in which a liquid crystal panel 93 sandwiched from both sides by the first obliquely deposited film 91 and the second obliquely deposited film 92 is sealed in a transparent cell 95, and operates similarly to the imaging apparatus in the fifth embodiment.

As shown in the figure, the first obliquely deposited film 91 and the second obliquely deposited film 92 respectively have optical axes A91 and A92 that are plane-symmetrical with respect to the liquid crystal panel 93, have a birefringence and function similarly to the first quartz-crystal plate 61 and the second quartz-crystal plate 62 in FIG. 6. Although the first obliquely deposited film 91 and the second obliquely deposited film 92 are formed directly on the liquid crystal panel 93 in FIG. 9, they also may be formed on a sheet or a substrate, which then is attached to the liquid crystal panel 93.

The obliquely deposited films 91 and 92 may be obtained by being formed on a substrate from an oblique direction by vacuum deposition. A heavy metal oxide such as tantalum oxide, tungsten oxide or titanium oxide as a film material is fused by an electron beam, deposited at room temperature while introducing an oxygen gas into a film forming tank as necessary, so that the film material turns into a transparent oblique columnar shape as shown in FIG. 9 and adheres to the substrate. Since the film density differs between the direction of the optical axis A91, A92 and directions perpendicular thereto (a direction within the surface of the sheet of FIG. 9 and a direction normal to this surface), the difference in refractive index also arises. In other words, the obliquely deposited films 91 and 92 have a birefringence in which the refractive indices in three axial directions are different, similarly to a biaxial crystal.

For example, when tantalum oxide is deposited on the substrate from a direction at about 70° to a normal line of the substrate, the resultant film is formed of many columns tilted by 30° to 35° with respect to the normal line of the substrate. The film has a birefringence ($\Delta n$) of about 0.08. This is extremely larger than the birefringence of quartz crystal, which is 0.01. This means that the use of the obliquely deposited film allows an extremely small thickness for obtaining an equivalent retardation.

For example, in the case where a solid-state imaging device 65 having a pixel pitch of 2.5 μm is used to shift the image forming position by a half of the pixel pitch as described in the fifth embodiment, a quartz-crystal plate has to be at least 200 μm thick as described in the fifth embodiment. On the other hand, a tantalum oxide obliquely deposited film even can be a little thinner than 30 μm. It is duly possible to form an obliquely deposited film with such a thickness. Also, a mass production thereof is possible.

However, there is a problem in that the obliquely deposited film has a birefringence that tends to vary according to changes in environment, especially in humidity. When the humidity is high, water molecules get in the gap inside the obliquely deposited film, thus lowering its birefringence. Conversely, when the humidity decreases, the birefringence rises.

As shown in FIG. 9, the obliquely deposited films 91 and 92 are sealed by the transparent cell 95, thereby stabilizing the birefringence of the obliquely deposited films 91 and 92. It should be noted that the sealing method is not limited to this but may be by forming a protective layer on the film surface or by attaching a protective sheet to the film surface.

As described above, the obliquely deposited films 91 and 92 are used as elements for shifting by their birefringent effect the traveling path of a light beam according to its polarization direction, thus enhancing cost effectiveness of the apparatus compared with the case of using a quartz-crystal plate.

Eighth Embodiment

Figure 10:
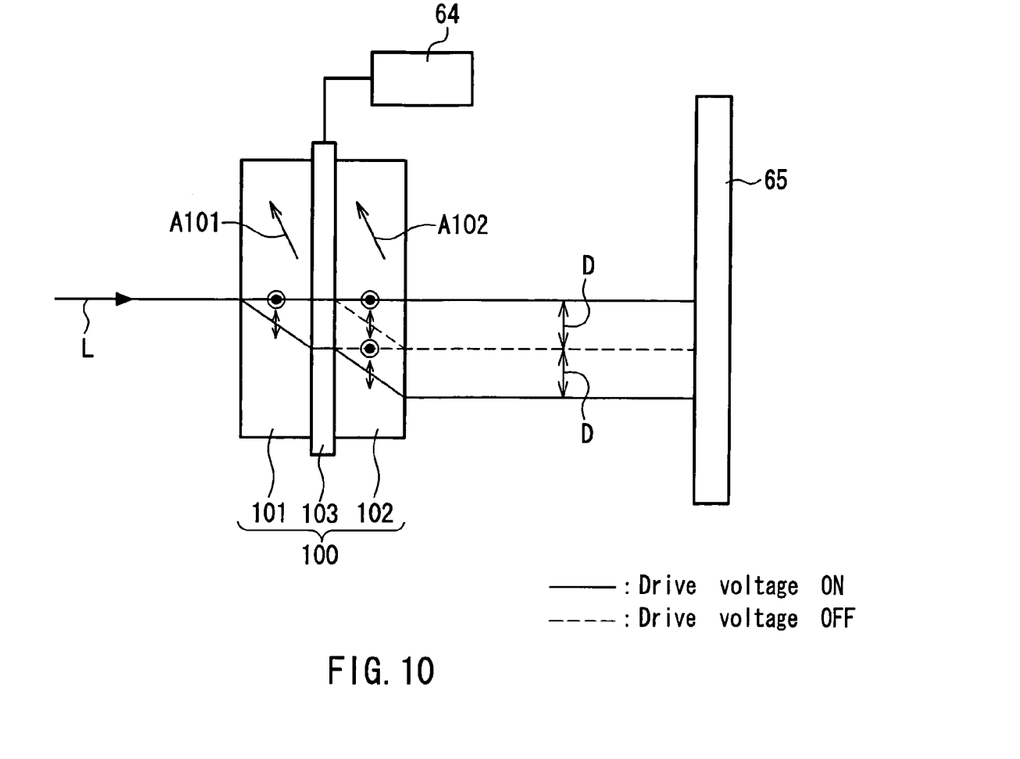
FIG. 10 is a structural view showing an imaging apparatus according to an eighth embodiment of the present invention.

FIG. 10 shows a major portion of an imaging apparatus according to the eighth embodiment of the present invention. The imaging apparatus of the present embodiment includes an optical system 100 having a first quartz-crystal plate 101, a second quartz-crystal plate 102 and a liquid crystal panel 103 arranged therebetween. In the fifth embodiment described above (see FIG. 6), the first quartz-crystal plate 61 and the second quartz-crystal plate 62 have the optical axes A61 and A62 that are plane-symmetrical with respect to the liquid crystal panel 63. However, in the present embodiment, an optical axis A101 of the first quartz-crystal plate 101 and an optical axis A102 of the second quartz-crystal plate 102 are parallel with each other. Other than the above, this imaging apparatus is similar to the imaging apparatus according to the fifth embodiment.

In the present embodiment, when a drive voltage to be applied to the liquid crystal panel 103 is OFF, two light beams that have been split by the first quartz-crystal plate 101 travel along paths indicated by broken lines, so that one subject image is formed on the solid-state imaging device 65. In this case, signal information on the light beam reaching each pixel in the solid-state imaging device 65 is fetched as it is, and its data are stored as first image information.

On the other hand, when the drive voltage to be applied to the liquid crystal panel 103 is ON, the two light beams split by the first quartz-crystal plate 101 form two partially-overlapping subject images on the solid-state imaging device 65. These two subject images in the ON state respectively are displaced by an equal distance D upwardly and downwardly in FIG. 10 from the one image in the OFF state.

Similarly to the fifth embodiment described above, image information on either of the subject images (second image information) is reproduced from the image information on the two double-exposed subject images in the ON state and then superimposed onto the above-noted first image information in the OFF state. In this way, it is possible to achieve high-resolution image information having twice as many pixels as the solid-state imaging device 65.

Although the first, second, fourth, fifth, sixth and eighth embodiments described above use a quartz-crystal plate as an element having a birefringent effect, the present invention is not limited to them. An element using an electric birefringent effect (Kerr effect) or an element using a magnetic birefringent effect also may be used as long as it has a birefringent effect.

Although a pair of quartz-crystal plates or a pair of obliquely deposited films arranged on both sides of the liquid crystal panel have an equal thickness and are arranged so that their optical axes are aligned in a predetermined direction in the first to eighth embodiments described above, the present invention is not limited to them. The optical axis directions, thicknesses, refractive indices etc. thereof can be adjusted suitably as long as the traveling path of a light beam having a specific polarization direction can be shifted by the same amount.

Furthermore, although the liquid crystal panel is used as an element for rotating the polarization direction in the first to eighth embodiments described above, it also may be possible to use a Pockels cell formed of a crystal having an electrooptic effect.

Although there is no particular limitation on a field to which the present invention is applied, the present invention can be applied to, for example, a small camera module.

The invention may be embodied in other specific forms without departing from the spirit or essential characteristics thereof. The embodiments disclosed in this application are to be considered in all respects as illustrative and not restrictive, the scope of the invention being indicated by the appended claims rather than by the foregoing description, all changes that come within the meaning and range of equivalency of the claims are intended to be embraced therein.

What is claimed is:

1. An imaging method by which a relative positional relationship between a subject image formed on a solid-state imaging device and pixels in the solid-state imaging device is changed time-wise by an odd multiple of a half of an array pitch of the pixels so as to obtain a high-resolution image, the imaging method comprising:

switching time-wise between a first time period for splitting a light beam from a subject into a plurality of light beams that have different polarization directions and then combining the plurality of light beams to form a single subject image on the solid-state imaging device and a second time period for splitting the light beam from the subject into the plurality of light beams that have different polarization directions and forming a plurality of subject images that overlap each other partially on the solid-state imaging device;

obtaining a first image information on the single subject image based on pieces of signal information on the light beam reaching the pixels in the solid-state imaging device in the first time period;

calculating a second image information on one of the plurality of subject images by using and computing pieces of signal information on the light beams reaching the pixels in the solid-state imaging device in the second time period; and using the first image information and the second image information to obtain a high-resolution image of the subject.

2. The imaging method according to claim 1, wherein the second image information is calculated by using a piece of signal information from a pixel at which only one of the plurality of subject images is formed.

3. The imaging method according to claim 1, wherein the second image information is calculated by extracting an area including a plurality of pixels adjacent to each other from which equivalent pieces of signal information are obtained in the first time period, and assuming that respective pieces of signal information in the plurality of pixels in the area among the pieces of signal information in the second time period immediately after the first time period are equal to each other, computing the pieces of signal information in the second time period.

4. An imaging apparatus comprising:
a first optical system comprising a first transparent element and a second transparent element for shifting a traveling path of a light beam according to its polarization direction by a birefringent effect, and a first liquid crystal panel that is arranged between the first transparent element and the second transparent element and rotates a transmitted light beam according to ON/OFF of a voltage to be applied thereto;
a solid-state imaging device; and
a first voltage control system for controlling the voltage to be applied to the first liquid crystal panel;
wherein a light beam from a subject passes through the first optical system and forms an image as a subject image on the solid-state imaging device,
by switching between ON/OFF of the voltage to be applied to the first liquid crystal panel, a single subject image and partially-overlapping first and second subject images are formed alternately on the solid-state imaging device,
the first transparent element splits the light beam from the subject into two polarized light beams that have different polarization directions and spaces traveling paths of the two polarized light beams away from each other by a distance D,
the first liquid crystal panel rotates the polarization directions of the two polarized light beams that have left the first transparent element by 0° or 90° according to the voltage to be applied,
the second transparent element shifts one of the traveling paths of the two polarized light beams that have left the first liquid crystal panel according to their polarization directions so as to watch the traveling paths of the two polarized light beams or expand a space between the traveling paths of the two polarized light beams to a distance 2D, and
the solid-state imaging device reads out a light intensity distribution formed by the two polarized light beams that have left the second transparent element, and
the apparatus further comprising a signal processing circuit far using the light intensity distribution formed by the two polarized light beams that have the space between the traveling paths expanded to the distance 2D so as to calculate a light intensity distribution of one of the two polarized light beams, and using this light intensity distribution and the light intensity distribution formed by the two polarized light beams whose traveling paths are matched so as to compute and obtain a light intensity distribution of the image of the subject.

5. The imaging apparatus according to claim 4, further comprising
a second optical system comprising a third transparent element and a fourth transparent element for shifting a traveling path of a light beam according to its polarization direction by a birefringent effect, and a second liquid crystal panel that is arranged between the third transparent element and the fourth transparent element and rotates a transmitted light beam according to ON/OFF of a voltage to be applied thereto, and
a second voltage control system for controlling the voltage to be applied to the second liquid crystal panel,
wherein the light beam from the subject passes through the first optical system and the second optical system and forms an image as a subject image on the solid-state imaging device, and
by switching between ON/OFF of the voltage to be applied respectively to the first liquid crystal panel and the second liquid crystal panel, the single subject image, the first and second subject images that are at different positions in a first direction and third and fourth subject images that are at different positions in a second direction different from the first direction are formed sequentially on the solid-state imaging device.

6. The imaging apparatus according to claim 5, wherein the third transparent element and the fourth transparent element are obliquely deposited metal oxide films.

7. The imaging apparatus according to claim 5, wherein the second liquid crystal panel is a twisted nematic liquid crystal panel.

8. The imaging apparatus according to claim 4, wherein the first transparent element and the second transparent element are obliquely deposited metal oxide films.

9. The imaging apparatus according to claim 4, wherein the first liquid crystal panel is a twisted nematic liquid crystal panel.

10. The imaging apparatus according to claim 4, wherein the solid-state imaging device is a MOS sensor.

* * * * *